United States Patent [19]

Ishikawa

[11] Patent Number: 5,627,706
[45] Date of Patent: May 6, 1997

[54] CASSETTE HALF HAVING MULTI-LAYER MOLDED CONSTRUCTION

[75] Inventor: Ko Ishikawa, Miyagi, Japan

[73] Assignee: Sony Corporation, Tokyo, Japan

[21] Appl. No.: 550,402

[22] Filed: Oct. 30, 1995

Related U.S. Application Data

[62] Division of Ser. No. 275,364, Jul. 15, 1994, Pat. No. 5,508,870.

[30] Foreign Application Priority Data

Jul. 20, 1993 [JP] Japan ................................. 5-179228

[51] Int. Cl.$^6$ ............................. G11B 23/02; B29C 39/12; G03B 23/02
[52] U.S. Cl. ..................... 360/132; 360/137; 264/245; 242/347
[58] Field of Search ................... 264/255, 328.7, 264/245; 360/132, 137; 220/453; 242/347

[56] References Cited

U.S. PATENT DOCUMENTS

| | | | |
|---|---|---|---|
| 4,458,858 | 7/1984 | Nelson | 242/199 |
| 4,688,128 | 8/1987 | Shiba et al. | 360/132 |
| 4,840,760 | 6/1989 | Oishi | 264/245 |
| 4,965,690 | 10/1990 | Tanaka et al. | 360/132 |
| 5,418,671 | 5/1995 | Schoettle et al. | 360/132 |

FOREIGN PATENT DOCUMENTS

| | | |
|---|---|---|
| 0384356 | 8/1990 | European Pat. Off. |
| 0422658 | 4/1991 | European Pat. Off. |
| 0481468 | 4/1992 | European Pat. Off. |
| 3604261 | 8/1986 | Germany |
| 3724450 | 2/1988 | Germany |
| 4031410 | 4/1991 | Germany |
| 2055755 | 3/1981 | United Kingdom |

*Primary Examiner*—Robert S. Tupper
*Assistant Examiner*—Adriana Giordana
*Attorney, Agent, or Firm*—Ronald P. Kananen

[57] ABSTRACT

A tape cassette includes a pair of cassette halves and a pair of hubs enclosed between the cassette halves, and about which a recording medium, or tape can be wound. Each cassette half includes a first molded body and a second molded body overlying it. The first molded body has a first principal surface and a first upstanding wall which is perpendicular to the principal surface and forms an integral part thereof and a part of a peripheral surface of the half. The second molded body has a second principal surface which is generally rectangular and overlies the first principal surface, and a second upstanding wall connected to the first upstanding wall to form the peripheral surface of the half therewith, forming an integral part of the second principal surface and surrounding it. The first and second upstanding walls are connected by a junction having a thickness increasing gradually across the thickness of the half.

5 Claims, 9 Drawing Sheets

1

CASSETTE HALF HAVING MULTI-LAYER MOLDED CONSTRUCTION

This application is a division of application Ser. No. 08/275,364 filed Jul. 15, 1994, now U.S. Pat. No. 5,508,870.

BACKGROUND

1. Field of the Invention

The present invention relates to a cassette half and a tape cassette. More particularly, the present invention relates to a cassette half having a two-layer structure and a tape cassette formed by a pair of such cassette halves.

2. Background of the Invention

There is known a cassette for e.g. a sound recording and reproducing tape which includes a pair of cassette halves fitted together, and a pair of reel hubs which are enclosed between the cassette halves, and on which the tape can be wound. Each cassette half may have a two-layer structure as shown at 101 in FIG. 1, and include an inner resin layer 102 formed from a resin having a low modulus of elasticity, and an outer resin layer 103 formed from a resin having a high modulus of elasticity on the inner resin layer 102, as shown in FIGS. 1 to 3. The inner resin layer 102 improves the vibration-damping property of the cassette half.

The cassette half 101 is formed by injection molding the inner resin layer 102 in a mold, and the outer resin layer 103 on the outer surface of the inner resin layer 102. The outer resin layer 103 has a thin portion 104 lying on the inner resin layer 102, and a thick portion 105 contiguous to the thin portion 104, both as viewed across the thickness of the cassette half.

Each cassette half 101 has in the principal surface a pair of holes 107 through which the reel shafts, respectively, of a tape recording and/or reproducing apparatus can be inserted, as shown in FIG. 1. The two cassette halves 101 are joined together by screws, etc. to assemble a tape cassette 111, as shown in FIG. 1. Each cassette half 101 has in one of its edge surfaces a plurality of cuts which enable the cassette 111 to have a plurality of openings 108 through which the tape can be partly exposed, and into which the heads, pinch rollers, etc. of the recording and/or reproducing apparatus can be inserted. Reel hubs 109 and 110 partly project into the holes 107, respectively, and are rotatable by the reel shafts passed through the holes 107.

The outer resin layer 103 of each cassette half 101 has, however, an abrupt change in thickness between its thin and thick portions 104 and 105, as FIG. 2 shows that the thick portion 105 has an end surface 106 which is substantially perpendicular to the thin portion 104, or has an angle of about 90° thereto. The shape of the outer resin layer 103 as described is apparently responsible for the problems which will be pointed out below:

(1) When the outer resin layer 103 hardens after injection molding, its shrinkage occurs to a greatly different degree between its thin and thick portions 104 and 105. The thick portion 105 undergoes much more shrinkage than the thin portion 104. As a result, the thick portion 105 becomes warped, as shown in FIG. 3, and the cassette half 101 is, therefore, deformed;

(2) The use of any cassette half 101 deformed by the warpage of its thick portion 105 has an adverse effect on the accuracy in thickness of the tape cassette 111; and (3) The cassette 111 has a gap δ formed between the thick portions 105 of the cassette halves 101, as shown in FIG. 3. The gap δ is undesirable, since it is likely that dust, or the like may enter the cassette through the gap, or that a magnetic tape 112 may be caught in the gap, and thereby damaged.

SUMMARY OF THE INVENTION

It is, therefore, an object of this invention to provide a cassette half which can overcome the problems as hereinabove pointed out.

It is another object of this invention to provide a tape cassette which can overcome the problems as hereinabove pointed out.

According to one aspect of this invention, there is provided a cassette half including an inner resin layer and an outer resin layer formed by injection molding and overlying the inner resin layer, the outer resin layer having a thin portion overlying the inner resin layer and a thick portion adjoining the thin portion, the outer resin layer having between its thin and thick portions a boundary portion having a thickness increasing gradually from the thin to the thick portion.

According to another aspect of this invention, there is provided a cassette half including a first molded body and a second molded body overlying the first molded body, the first molded body having a first principal surface and a first upstanding wall which is perpendicular to the principal surface and forms an integral part thereof and a part of a peripheral surface of the half, the second molded body having a second principal surface which is generally rectangular and overlies the first principal surface, and a second upstanding wall connected to the first upstanding wall to form the peripheral surface of the half with the first upstanding wall, forming an integral part of the second principal surface and surrounding it, the first and second upstanding walls being connected by a connecting portion having a thickness increasing gradually across the thickness of the half.

According to still another aspect of this invention, there is provided a tape cassette including a pair of cassette halves and a pair of hubs which are enclosed between the halves, and about which a recording medium in tape form can be wound, each cassette half including a first molded body and a second molded body overlying the first molded body, the first molded body having a first principal surface and a first upstanding wall which is perpendicular to the principal surface and forms an integral part thereof and a part of a peripheral surface of the half, the second molded body having a second principal surface which is generally rectangular and overlies the first principal surface, and a second upstanding wall connected to the first upstanding wall to form the peripheral surface of the half with the first upstanding wall, forming an integral part of the second principal surface and surrounding it, the first and second upstanding walls being connected by a connecting portion having a thickness increasing gradually across the thickness of the half.

According to a still different aspect of this invention, there is provided a cassette half including a first molded body and a second molded body overlying the first molded body, the first molded body defining a first principal surface having anti-peeling means, the second molded body defining a second principal surface which is generally rectangular and overlies the first principal surface, and an upstanding wall forming an integral part of the second principal surface and surrounding it, the anti-peeling means being defined by a plurality of discrete concavities so arranged as to form the boundary of an area including portions corresponding to the gates of a mold for the first molded body.

According to a still different aspect of this invention, there is provided a tape cassette including a pair of cassette halves, a pair of hubs which are rotatably supported between the halves, and about which a recording medium in tape form can be wound, and a sheet member interposed between the inner surfaces of the halves and each hub and having portions contacting the hub, each cassette half including a first molded body and a second molded body overlying the first molded body, the first molded body defining a first principal surface having anti-peeling means, the second molded body defining a second principal surface which is generally rectangular and overlies the first principal surface, and an upstanding wall forming an integral part of the second principal surface and surrounding it, the first principal surface including a smooth surface on which the hubs are rotatably supported.

As the first and second molded bodies forming the cassette half of this invention are connected by a junction having a thickness increasing gradually across the thickness of the cassette half, the second molded body overlying the first molded body is not warped, or otherwise deformed. Therefore, the tape cassette of this invention is not deformed to form any undesirable gap between its halves.

The second molded body is of improved quality, since the resin flows smoothly from the inner region defined by the concavities to the outer region when the first molded body is molded.

As the principal surface of the first molded body includes a smooth surface on which the hubs are rotatably supported, it is possible to lower the contact resistance between that surface and the sheet members contacting the inner surface of the cassette halves, and thereby prevent the formation of ground dust by the sheet members during the rotation of the hubs.

DESCRIPTION OF THE INVENTION

Figure 4:
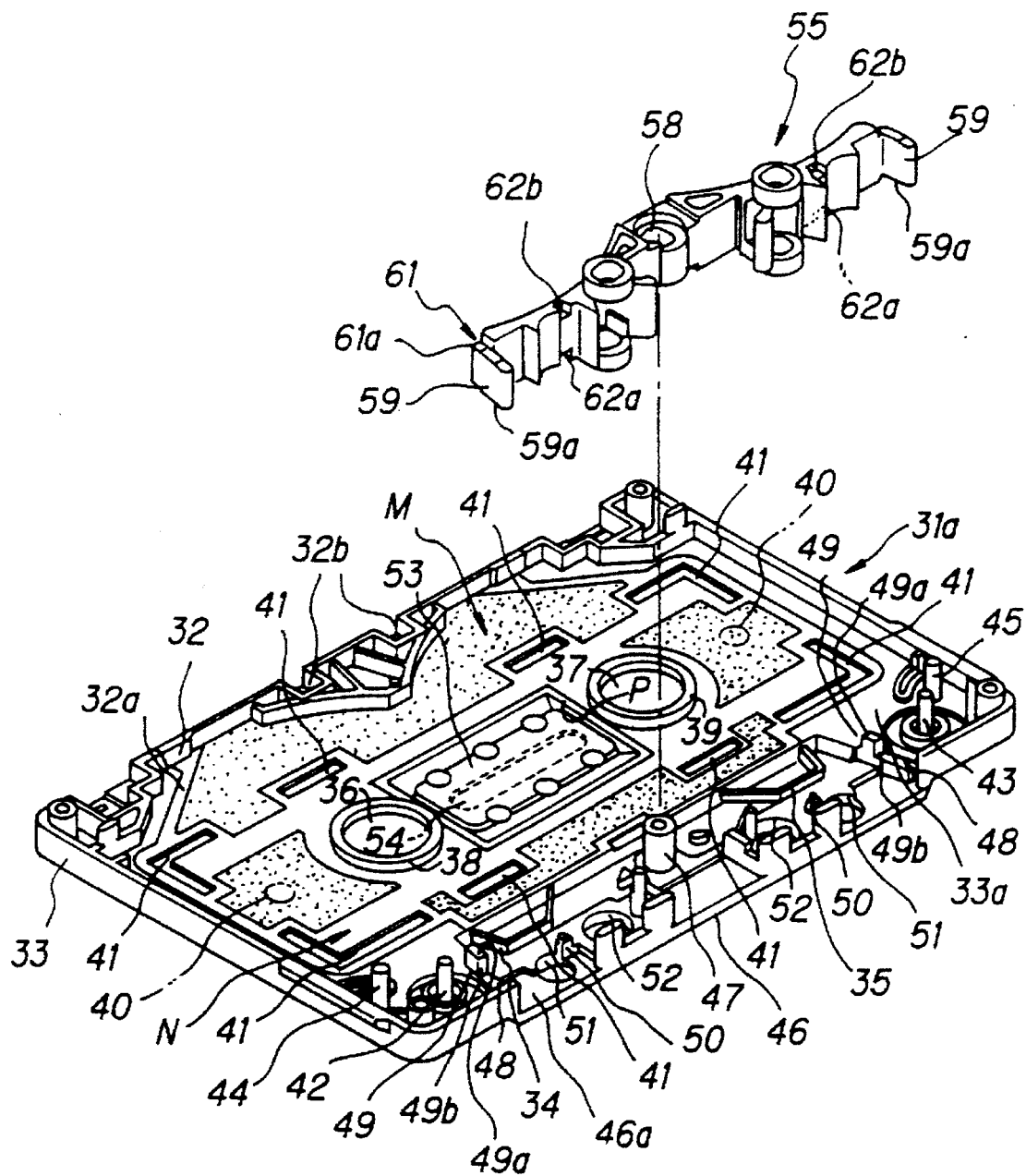
FIG. 4 is an exploded perspective view, as taken from top and front, of a cassette half and a guide block in a tape cassette according to a first embodiment of this invention.

The cassette half and tape cassette of this invention will now be described in detail with reference to the drawings. Reference is first made to FIGS. 4 to 9 showing the tape cassette according to the first embodiment of this invention. FIG. 4 shows the lower half 31a of the audio tape cassette and a guide block 55.

The lower half 31a is a product of the so-called "double-shot molding" including a first molded body 32 and a second molded body 33 overlying each other, and is, as a whole, shaped like a box having an open top. It can be made by, for example, injection molding. The first molded body 32 is first molded, and held in a mold, and the molding material is, then, injected into the mold to mold the second molded body 33 over the first molded body 32. The upper half 31b of the cassette is basically of the same construction with the lower half 31a, and no detailed description thereof will, therefore, be made.

The first molded body 32 is formed from a synthetic resin having a low modulus of elasticity, such as nylon, polypropylyne or polyurethane, and has a wall thickness of about 0.6 mm.

Figure 7A:
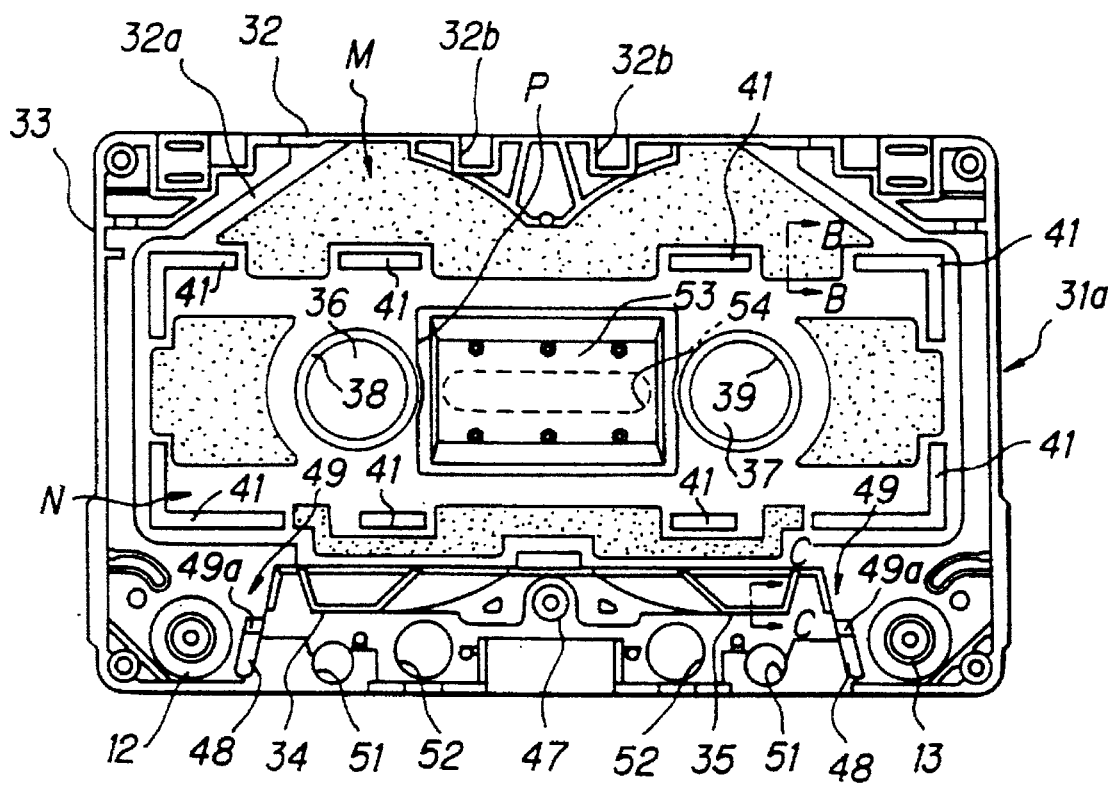
FIG. 7A is a top plan view of the lower half of the tape cassette according to the first embodiment of this invention.
Figure 7B:
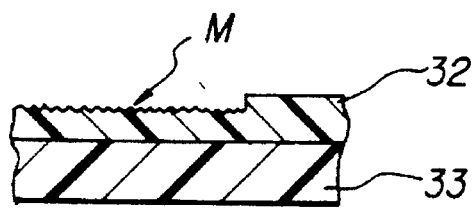
FIG. 7B is a sectional view taken along the line B—B of FIG. 7A.
Figure 7C:
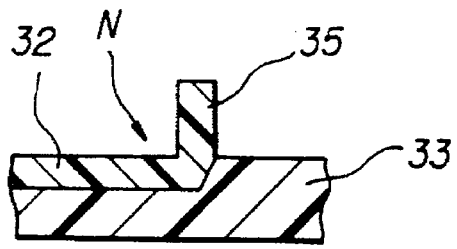
FIG. 7C is a sectional view taken along the line C—C of FIG. 7A.

The first molded body 32 is provided at its two front corners with two reinforcing ribs 34, and 35 which project upwardly from its principal surface 32a and which are spaced apart from each other along the length of the cassette half, as shown in FIGS. 4, 7A and 7C. The first molded body 32 is also provided in its central portion with two circular holes 36 and 37 spaced apart from each other along the length of the cassette half and two hub positioning ribs 38 and 39 extending along the inner edges of the holes 36 and 37, respectively. The first molded body 32 also has a rectangular opening P between the holes 36 and 37.

The first molded body 32 has also a plurality of discrete concavities 41 so arranged as to define the area including portions corresponding to a pair of gates 40 in a mold not shown and the area to be finally filled with the resin. The portion lying between every two adjoining concavities 41 is preferably located on a line connecting the portions corresponding to the gates 40 and the area to be finally filled with the resin.

The principal surface 32a of the first molded body 32 includes finely roughened or satinized surfaces M having a roughness of 10 microns RZ except in the vicinity of each concavity 41 and each of the ribs 38 and 39, and other protrusions formed by the concavities not shown of the mold not shown, as shown in FIGS. 4, 7A and 7B. The principal surface 32a also includes a smooth surface N in its portions supporting reel hubs 3 and 4 and facing the hub contacting portions of sheet members yet to be described, as shown in FIGS. 4, 7A and 7C.

Figure 8:
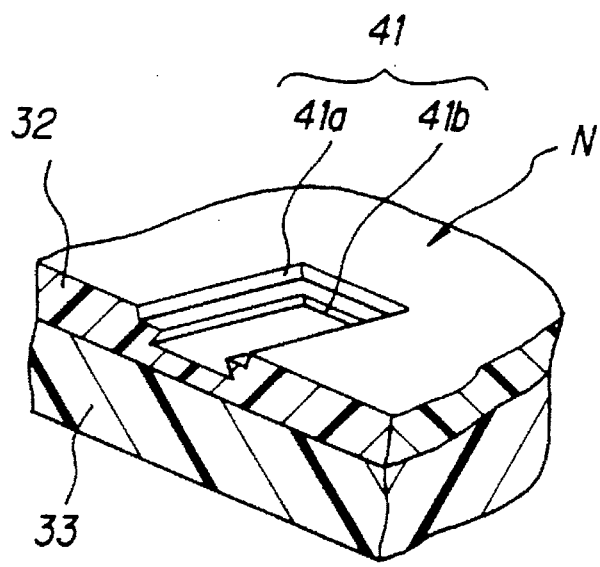
FIG. 8 is a sectional view showing the shape of a concavity formed in the half of the tape cassette according to the first embodiment of this invention.

Each concavity 41 is a combination of a first concavity 41a open in the principal surface 32a and having a rectangular cross section, and a smaller second concavity 41b formed like a dovetail groove in the bottom of the first concavity 41a, as shown in FIG. 8.

Recesses 32b are formed in the middle of the rear edge of the first molded body 32, and form a part of openings provided at the rear edge of the cassette half for enabling the detection of the type of a magnetic recording medium 5 in tape form.

The second molded body 33, which partly covers the opening P, is formed from a synthetic resin composition having a high modulus of elasticity, such as a mixture of nylon and an inorganic substance such as zinc oxide or aluminum silicate, and has a wall thickness of about 1.2 mm.

Figure 6A:
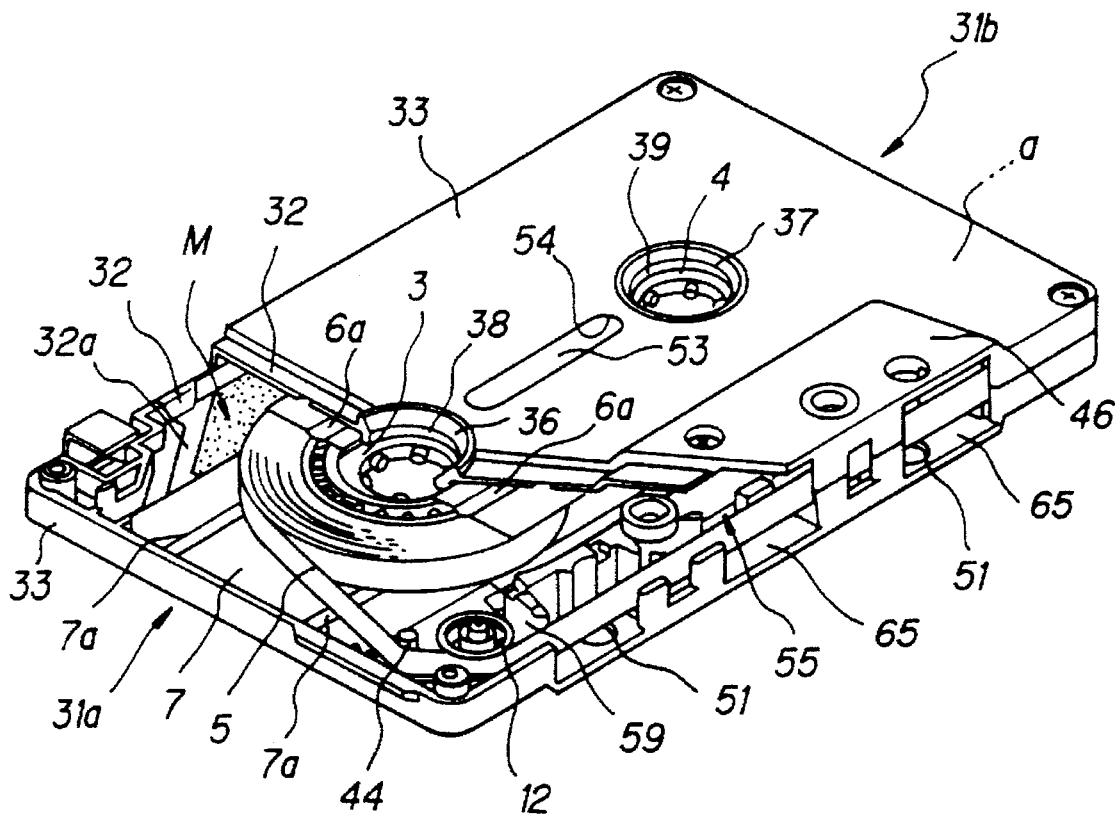
FIG. 6A is a partly cutway perspective view of the tape cassette according to the first embodiment of this invention.

The second molded body 33 is provided near its front corners with a pair of shafts 42 and 43 supporting a pair of guide rollers 12 and 13 rotatably, and a pair of guide pins 44 and 45 positioned near the guide rollers 12 and 13, respectively, as shown in FIGS. 4 and 6A. The guide rollers 12 and 13 are positioned close to the opposite ends, respectively, of the guide block and are rotatably supported by the shafts 42 and 43, respectively, for guiding the recording medium 5. Each of the shafts and guide pins forms an integral part of the second molded body 33.

The second molded body 33 is provided in the mid-portion of its front edge with a trapezoidal outward protrusion 46 having a second surface 46a which is lower than a first surface 33a having the guide pins 44 and 45. An upwardly or inwardly projecting boss 47 for positioning the guide block forms an integral part of the second surface 46a in the mid-portion of its rear edge.

The first and second surfaces 33a and 46a define a stepped surface 48 therebetween near each of the two front corners of the second molded body 33. Each stepped surface 48 has at its rear end a projection 49 forming an integral part of the second molded body 33 and defining a pair of surfaces 49a and 49b for positioning the guide block downwardly and in the direction of insertion of the cassette, or head, respectively. The second surface 46a is provided with a pair of pins 50 spaced apart from each other along the length of the cassette half for positioning the guide blocking the direction of removal of the cassette.

The second molded body 33 is also provided along its front edge with two pairs of holes 51 and 52 opening outwardly and inwardly of the protrusion 46 and providing passages for the capstan and guide pin, not shown, of a tape recorder not shown. The second molded body 33 has a window 54 provided in the center of the cassette half for enabling the visual inspection of the inside of the cassette. The window 54 faces the opening P, extends along the length of the cassette half, and is closed by a transparent member 53 secured to the cassette half by a plurality of pins projecting from the second molded body 33 along the window 54 and deformed by heat.

Figure 5:
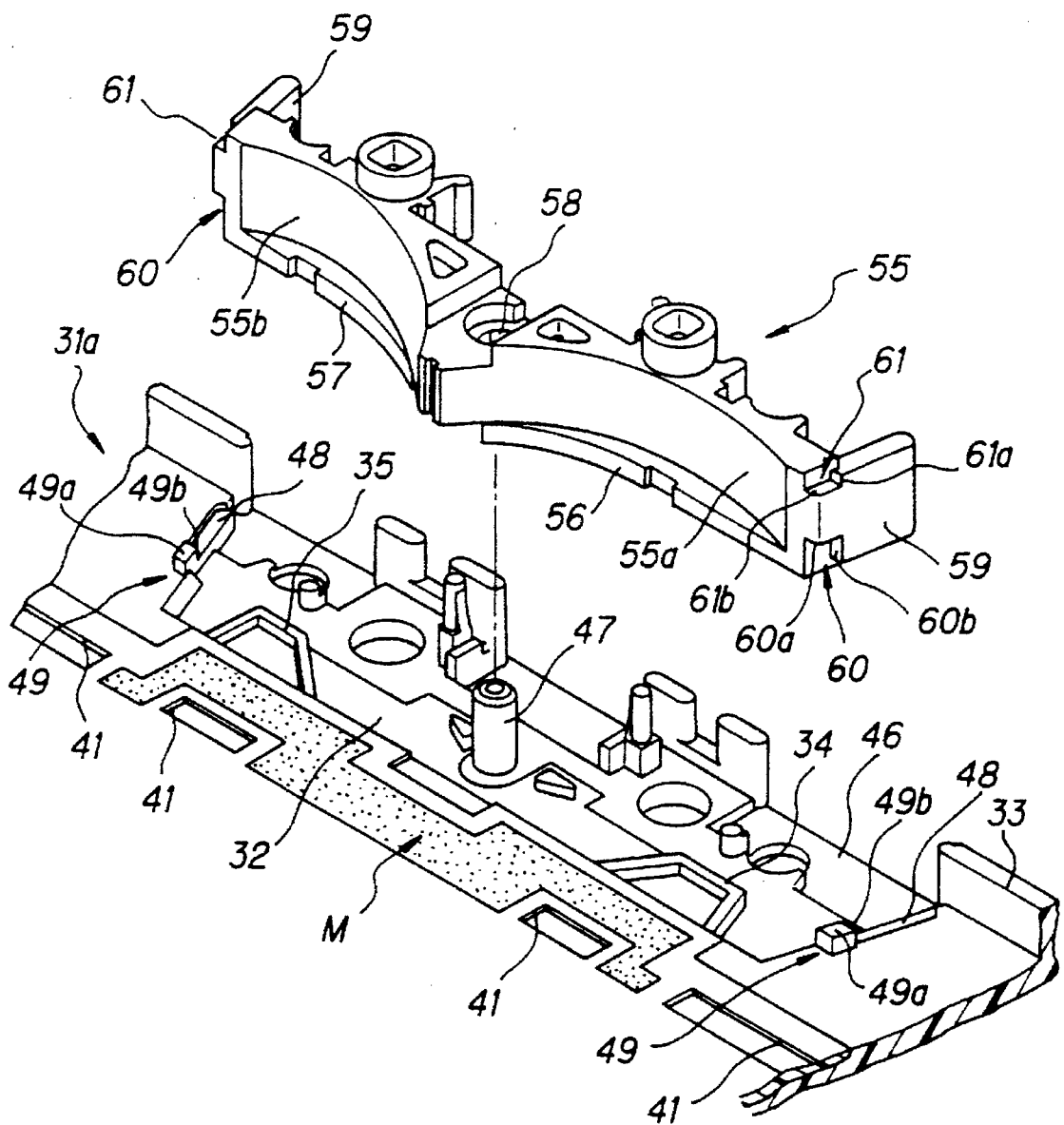
FIG. 5 is an enlarged perspective view, as taken from top and back, of a part of the cassette half and the guide block in the tape cassette according to the first embodiment of this invention.

The guide block 55 for guiding the travel of the recording medium is positioned along the front edge of the lower cassette half 31a and partly overlies the protrusion 46, as is obvious from FIG. 5. The guide block 55 has a pair of curved guide surfaces 55a and 55b extending from its opposite ends, respectively, to a central protrusion 55c along its back facing the reel hubs, and a pair of reinforcing ribs 56 and 57 extending along the lower edges of the guide surfaces 55a and 55b, respectively. The central protrusion 55c has a hole 58 through which the boss 47 is passed.

Figure 9:
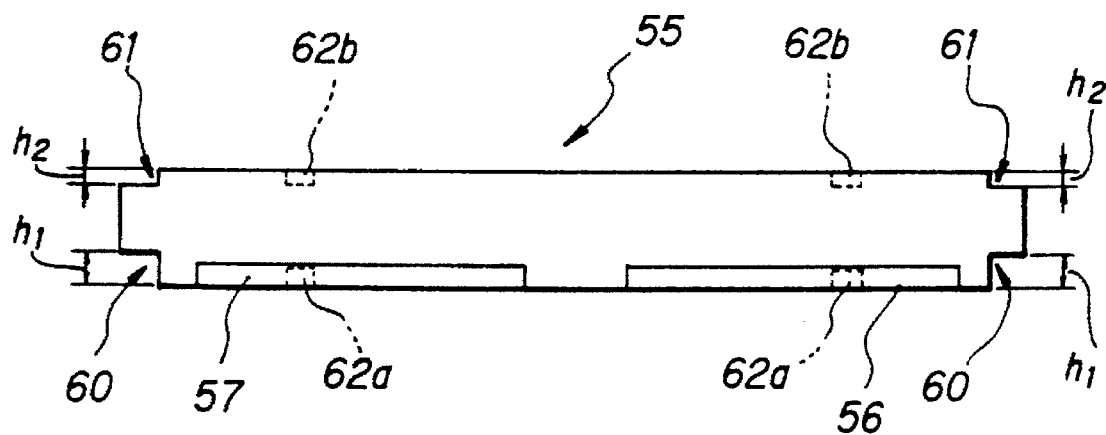
FIG. 9 is an elevational view explaining the positioning of the guide block in the tape cassette according to the first embodiment of this invention.

The guide block 55 is provided at each end with a bearing lug 59 having a mounting surface 59a adapted to rest on one of the stepped surfaces 48 on the cassette half. Each lug 59 has a recess 60 defining two positioning surfaces 60a and 60b adapted to engage the positioning surfaces 49a and 49b, respectively, adjacent to one of the stepped surfaces 48. Each lug 59 is also provided above the recess 60 with another recess 61 defining two positioning surfaces 61a and 61b adapted to engage two positioning surfaces formed on the upper cassette half not shown near each front corner thereof, and similar to the positioning surfaces 49a and 49b on the lower cassette half. The recess 61 has a depth $h_2$ which is smaller than the depth $h_1$ of the recess 60, as shown in FIG. 9. The guide block 55 has also two pairs of recesses 62a and 62b. One pair of recesses 62a are provided at the bottom of the guide block 55, and spaced apart from each other for receiving the pins 50 on the lower cassette half 31a, while the other pair of recesses 62b are provided at the top of the guide block 55 and above the recesses 62a, respectively, for receiving the pins 50 not shown on the upper cassette half 31b.

The upper and lower cassette halves 31b and 31a are joined together with e.g. screws to assemble the cassette, as shown in FIG. 6A. A pair of reel hubs 3 and 4 and a pair of sheet members 6 and 7 are enclosed between the cassette halves 31a and 31b. The reel hubs 3 and 4 engage the ribs 38 and 39, respectively, and are rotatable by the reel shafts of a tape recorder which are inserted through the holes 36 and 37, so that the magnetic recording medium, or tape 5 may be wound on the reel hub 3 or 4.

The sheet members 6 and 7 interposed between the reel hubs 3 and 4 and the inner surfaces of the cassette halves 31a and 31b, respectively, so that the reel hubs 3 and 4 may be sandwiched between the sheet members 6 and 7, and so that any frictional resistance to the rotation of the reel hubs may be reduced. Each sheet member 6 or 7 has at least a surface formed from a transparent material of low frictional resistance. Each sheet member 6 or 7 has a pair of parallel portions 6a or 7a extending along the length of the cassette and contacting the reel hubs 3 and 4. Each hub contacting portion 6a or 7a is a ridge projecting toward the reel hubs 3 and 4. Each sheet member 6 or 7 also has a pair of openings in which the ribs 38 and 39 are fitted, though they are not shown.

The magnetic recording medium, or tape 5 travels from one of the reel hub 3 to the other reel hub 4 past the guide roller 12, the lugs 59 on the guide block 55 and the guide roller 13. The tape 5 traveling past one of the lugs 59 is exposed through a plurality of openings 65 along the front edge of the cassette. If the cassette is placed in a tape recorder, the reel shafts of the recorder pass through the holes 36 and 37, and the capstan and guide pins through the holes 51 and 52. If the tape recorder is set for operation in the recording or reproduction mode, its magnetic head, pinch rollers, etc. project into the cassette through the openings 65. As a result, the tape 5 travels from one of the reel hubs 3 or 4 to the other, so that the recording of an information signal on the tape 5 or its reading from the tape 5 may be effected by the magnetic head.

Figure 6B:
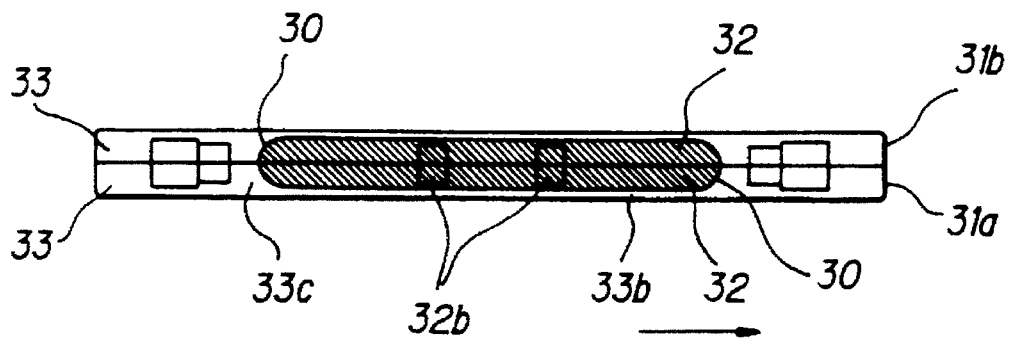
FIG. 6B is a rear elevational view thereof.

The first and second molded bodies 32 and 33 forming each cassette half 31a or 31b have a boundary, or junction 30 so shaped as to give the second molded body 33 a gradually increasing thickness from its thin wall portion 33b to its thick wall portion 33c, as shown in FIG. 6B. More specifically, the junction 30 is arcuately shaped. The junction 30 so shaped ensures that the resin forming the second molded body 33 shrink only to a gradually increasing degree in the direction of the arrow in FIG. 6B when it hardens, and that no undesirably great difference in shrinkage occur between the thin and thick wall portions 33b and 33c. Therefore, the second molded body 33 is not warped, and no cassette half 31a or 31b is warped, or otherwise deformed.

The first molded body 32 in each cassette half as hereinabove described has between every two adjoining concavities 41 a thickness which is greater than its thickness below each concavity 41. The resin passage in the mold not shown maintains an equal size along its depth in its portion designed to form the first molded body 32 between every two adjoining concavities 41, so that the resin injected to form the first molded body 32 may smoothly flow from the inner region defined by the concavities 41 to the outer region. As the resin passage in the mold does not have to be enlarged in its portion for forming any concavity in the first molded body 32, it is unlikely that any projection, not shown, on the first molded body 32 may be melted in the second molded body 33 when the latter is injection-molded.

It is possible to achieve the necessary contact resistance between the first molded body 32 and the mold not shown when the mold is opened, if the mold has an appropriately roughened surface. Although no finely roughened surface is made in the vicinity of any of the reinforcing ribs 34 and 35, hub positioning ribs 38 and 39, and other projections formed by the concavities not shown of the mod as is obvious from FIG. 7A, it is possible to achieve the necessary contact resistance as a result of the shrinkage of the resin upon cooling, as the areas M between those projections and the concavities of the mold are finely roughened.

The principal surface 32a of the first molded body 32 includes a smooth surface formed by the appropriately finished surface of the mold for lowering any contact resistance between its portions around the reel hubs 3 and 4 and its portions contacting the sheet members 6 and 7. The principal surface 32a also includes a smooth surface which lowers the contact resistance between the hub contacting portions 6a and 7a of the sheet members 6 and 7 and the principal surface 32a.

The depth $h_1$ of the recesses 60 of the guide block 55 is greater than the depth $h_2$ of the recesses 61 as shown in FIG. 9, so that a gap may be formed between the lower cassette half 31a and the guide block 55 if the guide block 55 is positioned upside down. The gap can be visually recognized to teach that the guide block 55 is wrongly positioned.

The positioning surfaces 49b of the protrusions 49 on the lower cassette half 31a ensure the accurate horizontal positioning of the guide block 55 on the lower cassette half 31a. The provision of similar positioning surfaces on the upper cassette half 31b ensures the accurate horizontal positioning of the guide block 55 to a further extent.

Although the surface M has been described as having a roughness of 10 microns RZ, it is merely illustrative, and may range from 5 to 30 microns RZ.

Although the ribs 56 and 57 have been shown as being formed along the bottom of the guide block 55, they may alternatively be formed along its top, if the recesses 61 are formed with a depth which is greater than that of the recesses 60.

Figure 10:
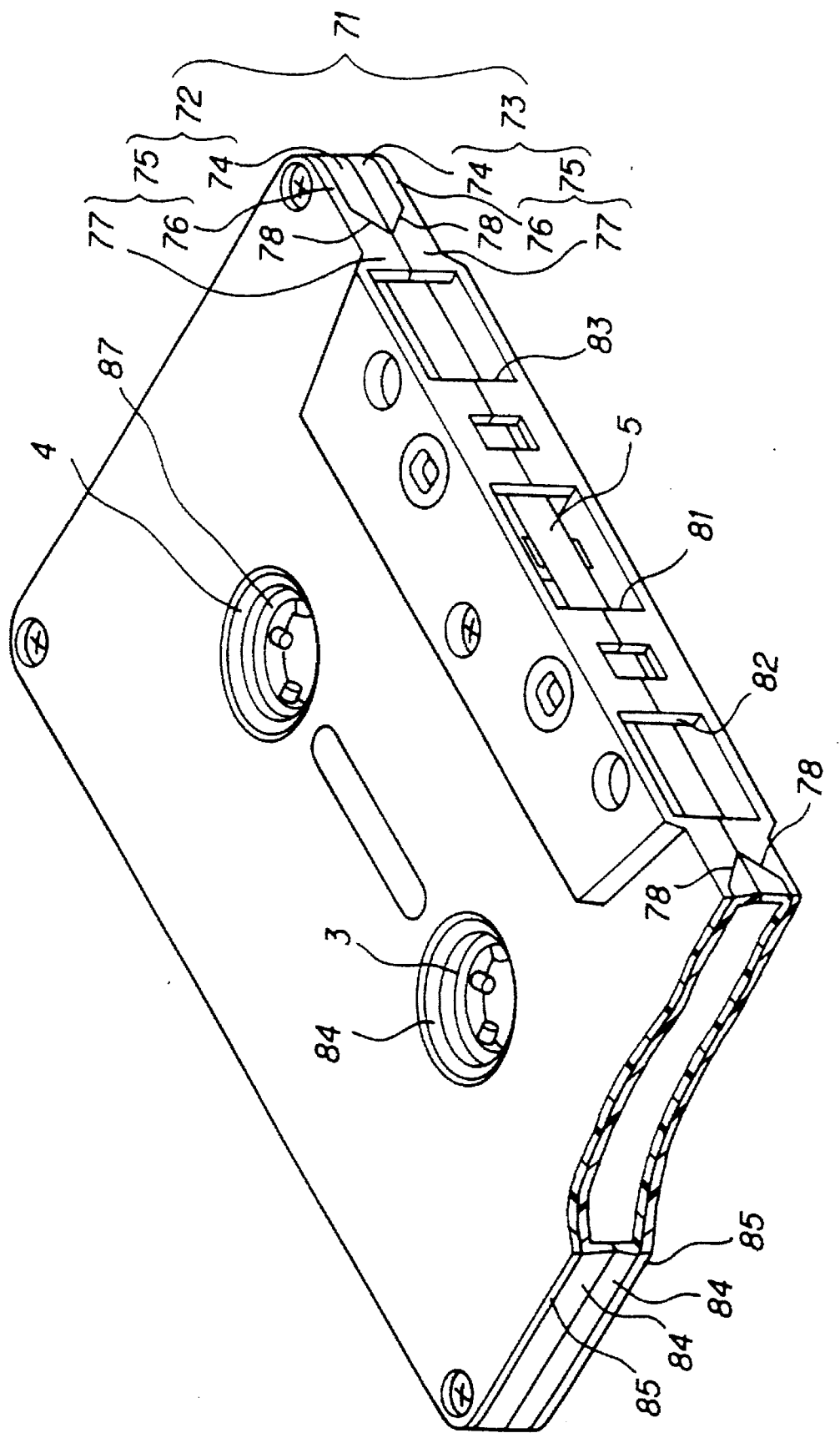
FIG. 10 is a partly cutaway perspective view of a tape cassette according to a second embodiment of this invention.
Figure 11:
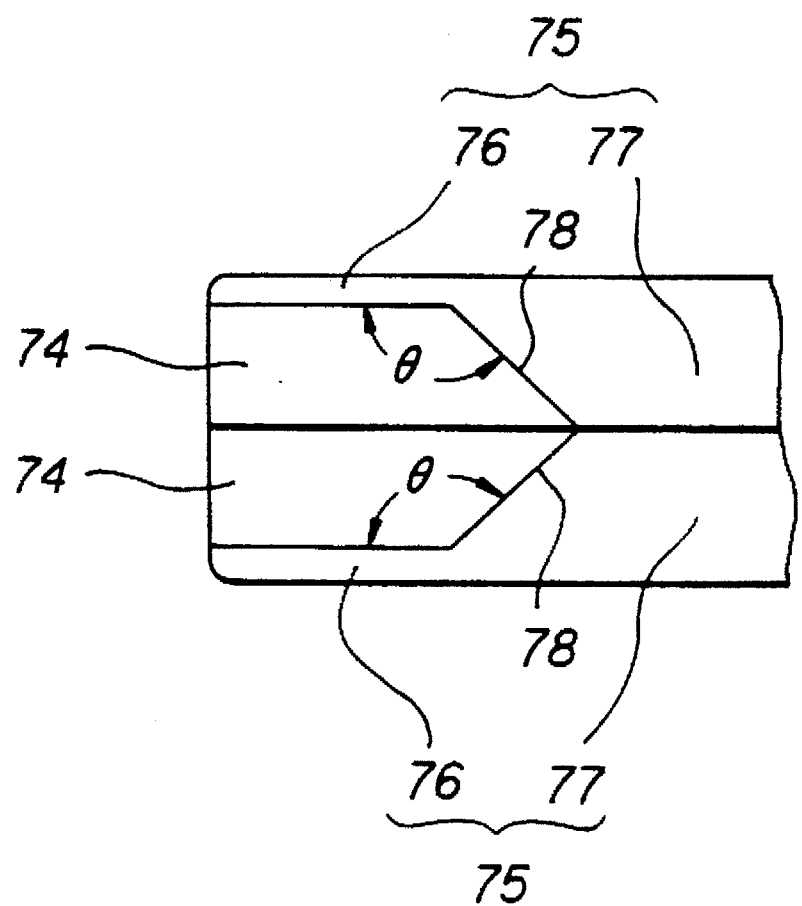
FIG. 11 is an enlarged view of a part of the tape cassette shown in FIG. 10.

Reference is now made to FIGS. 10 and 11 showing a tape cassette according to a second embodiment of this invention. The tape cassette 71 has a pair of halves 72 and 73. Each cassette half 72 or 73 is two-layer structure including an inner resin layer 74 as a first molded body and an outer resin layer 75 formed as a second molded body and overlying the inner resin layer 74. The inner resin layer 74 is of a relatively soft synthetic resin having a low modules of elasticity, such as nylon, polypropylene or polyurethane. The outer resin layer 75 is of a relatively hard synthetic resin composition having a high modules of elasticity, such as a mixture of nylon and an inorganic substance such as zinc oxide or aluminum silicate. Thus, the inner resin layer 74 serves for damping vibration, while the outer resin layer 75 gives the necessary rigidity to the cassette half 72 or 73.

The outer resin layer 75 of each cassette half includes a thin or narrow portion 76 overlying the inner resin layer 74 and a thick or broad portion 77 connected to the thin portion 76. The thin or thick portion 76 or 77 is thin or thick as viewed across the thickness of the cassette 71, as is obvious from the FIG. 10 or 11. The thin and thick portions 76 and 77 are connected by a junction or boundary portion 78 having a thickness or width increasing gradually from the thin portion 76 to the thick portion 77. The junction 78 has a surface inclined at an angle of 45° between the thin and thick portions 76 and 77, as is obvious from FIG. 11. Thus, the junction 78 gradually increases its thickness or width from the thin portion 76 to the thick portion 77.

The cassette 71 has an opening 81 formed between its halves 72 and 73 for the insertion of a magnetic head, a pair of openings 82 and 83 formed on the opposite side of the opening 81 from each other for the insertion of pinch rollers, and a pair of holes 84 and 85 formed through the top and bottom surface of its halves 72 and 73 for the insertion of spindles.

Figure 1:
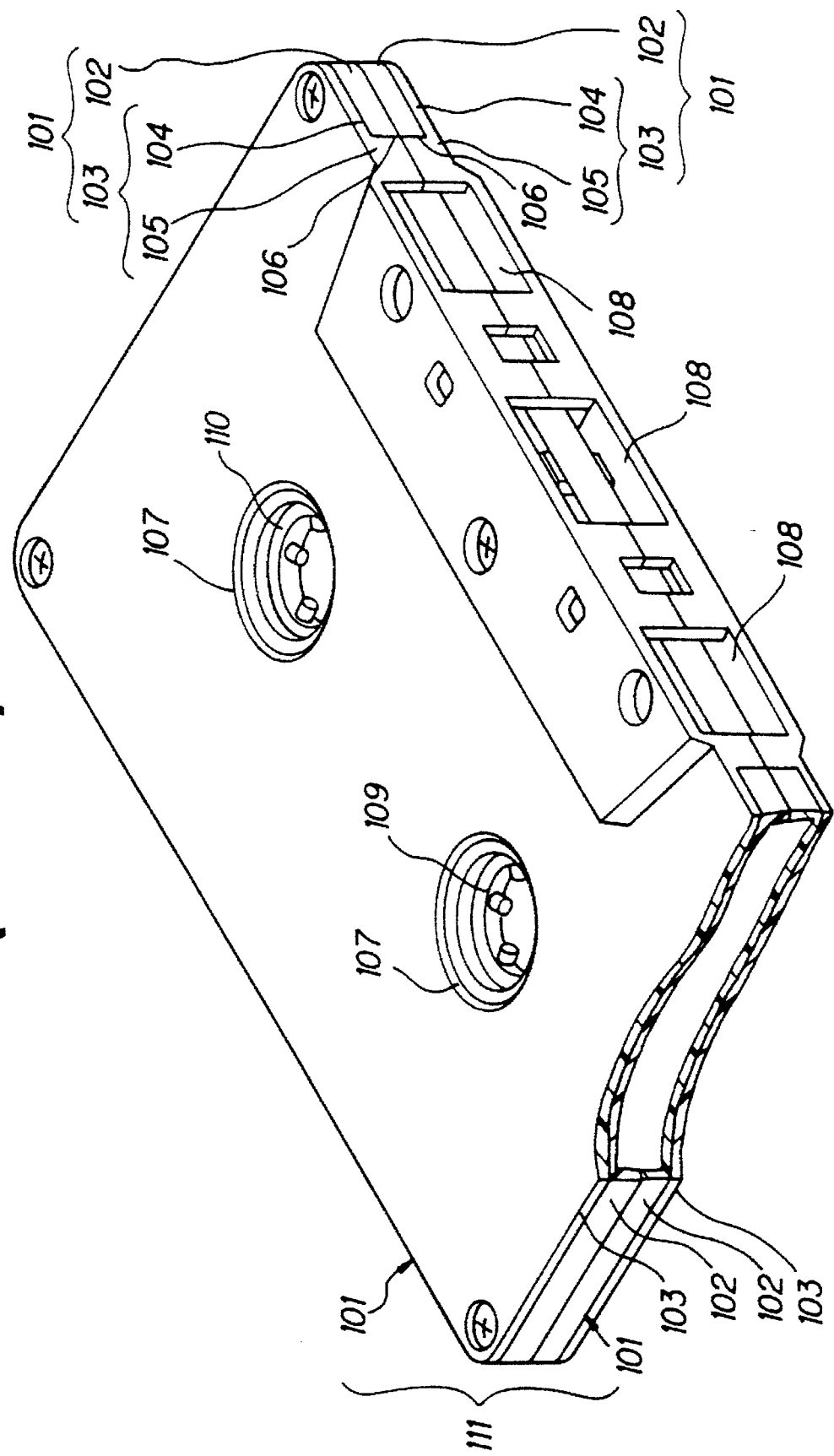
FIG. 1 is a partly cutaway perspective view of a tape cassette of the type to which this invention pertains.
Figure 2:
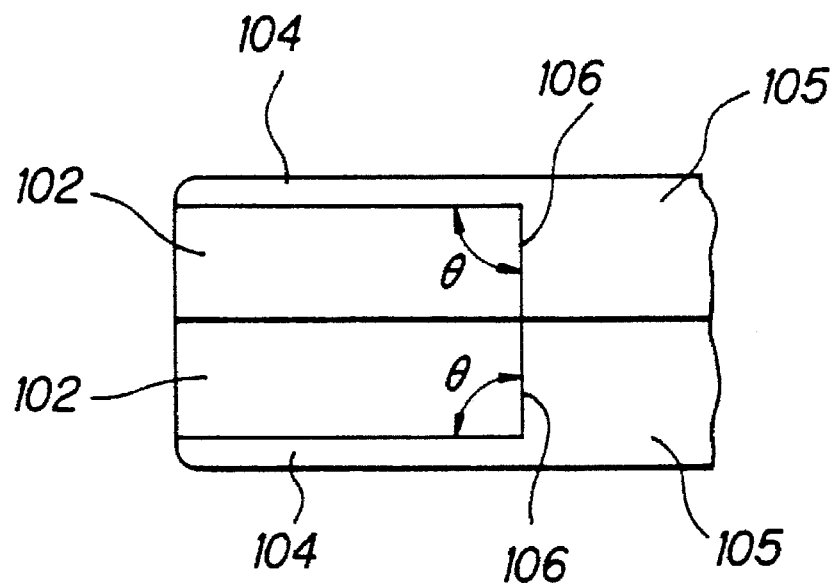
FIG. 2 is an enlarged view of a part of the tape cassette shown in FIG. 1.
Figure 3:
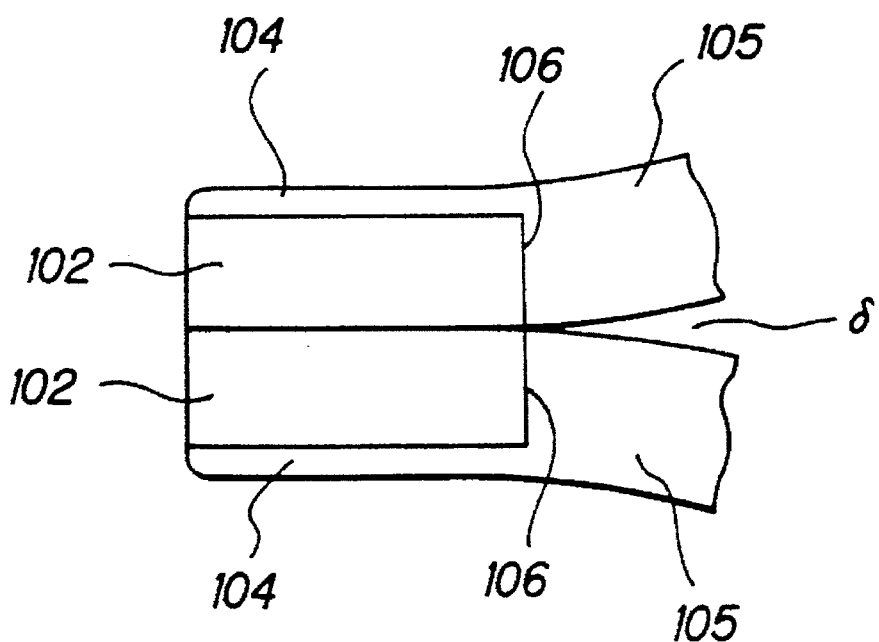
FIG. 3 is a view showing the drawback of the tape cassette shown in FIG. 1.

When the resin injected to mold the outer resin layer 75 of each cassette half is cooled, it shrinks to a gradually increasing extent from the thin portion 76 to the thick portion 77. Any abrupt change does not occur in the degree of shrinkage between the thin and thick portions 76 and 77 that may cause the warpage of the outer resin layer 75 in any way as shown in FIG. 3.

Although the angle as defined by the junction 78 has been stated as 45°, it can be increased to prolong the junction 78 to ensure to a further extent that the outer resin layer 75 be protected against warpage.

The tape cassette 71 is otherwise of the same construction with cassette as hereinbefore described with reference to FIGS. 4 to 9. No repeated description of their common features is, therefore, made.

While the invention has been described in its preferred forms of audio tape cassettes, it is equally applicable to other types of tape cassettes.

What is claimed is:

1. A cassette half comprising:

a first molded body having a first principal surface and a first upstanding wall which is substantially perpendicular to said first principal surface, said first upstanding wall forming an integral part of said first principal surface and a part of a peripheral surface of said half;

a second molded body overlying said first molded body, said second molded body having a second principal surface which overlies said first principal surface, said second molded body having a second upstanding wall which is essentially perpendicular to said second principal surface, said second upstanding wall forming an integral part of said second principal surface and surrounding said second principal surface, said second upstanding wall forming part of the peripheral surface of said half, said second upstanding wall connecting with said first upstanding wall to form a complete peripheral surface of said half, said first and second upstanding walls being connected over a junction area so that, in a plane defined by a surface of said upstanding walls, the respective thickness of the first upstanding wall and the thickness of the second upstanding wall gradually vary in a manner wherein a sum of the thicknesses of said first and second upstanding walls, as measured in said plane, remains constant and equal to the thickness of said cassette half over said junction area.

2. A cassette half according to claim 1, wherein a line defined by the connection between the first upstanding wall and the second upstanding wall, where the thickness of the first upstanding wall and the thickness of the second upstanding wall gradually change, has an arcuately curved shape.

3. A cassette half according to claim 2, wherein a line defined by the connection between the first upstanding wall and the second upstanding wall, where the thickness of the first upstanding wall and the thickness of the second upstanding wall gradually change, is inclined with respect to the direction in which the thicknesses of the first and second upstanding walls are summed.

4. A cassette half comprising:
   a first molded body having a first principal surface;
   a second molded body overlying said first molded body, said second molded body having a second principal surface which is generally rectangular and which overlies said first principal surface, said second molded body having an integral upstanding wall which is essentially normal to said second principal surface, the upstanding wall being integral with said second molded body and surrounding said second principal surface; and
   means for preventing separation of said first molded body from said second molded body including a plurality of discrete concavities formed in said first molded body, said discrete concavities each having side walls which are arranged along lines forming the boundaries of an area including portions of the first molded body corresponding to gates of a mold for the material of said first molded body.

5. A cassette half according to claim 4, wherein each of said discrete cavities comprises a first cavity portion having a bottom wall and side walls interconnecting the bottom wall with said first principal surface and a second smaller cavity portion formed in the bottom wall of the first cavity, said second smaller cavity portion having a dovetail shaped cross-section in a plane normal to said first principal surface.

* * * * *